(12) United States Patent
Zhou et al.

(10) Patent No.: US 9,106,404 B2
(45) Date of Patent: Aug. 11, 2015

(54) METHOD AND DEVICE FOR TRANSMITTING AND RECEIVING VIDEO

(71) Applicants: Peking University, Beijing (CN); Peking University Founder Group Co., Ltd., Beijing (CN); Beijing Founder Electronics Co., Ltd., Beijing (CN)

(72) Inventors: Chao Zhou, Beijing (CN); Xinggong Zhang, Beijing (CN); Zongming Guo, Beijing (CN)

(73) Assignees: PEKING UNIVERSITY, Beijing (CN); PEKING UNIVERSITY FOUNDER GROUP CO., LTD., Beijing (CN); BEIJING FOUNDER ELECTRONICS CO., Beinjing (CN)

( * ) Notice: Subject to any disclaimer, the term of this patent is extended or adjusted under 35 U.S.C. 154(b) by 0 days.

(21) Appl. No.: 14/123,133

(22) PCT Filed: Dec. 28, 2012

(86) PCT No.: PCT/CN2012/087907
§ 371 (c)(1),
(2) Date: Nov. 29, 2013

(87) PCT Pub. No.: WO2013/097782
PCT Pub. Date: Jul. 4, 2013

(65) Prior Publication Data
US 2015/0055721 A1 Feb. 26, 2015

(30) Foreign Application Priority Data
Dec. 29, 2011 (CN) .......................... 2011 1 0452500

(51) Int. Cl.
| | |
|---|---|
| *H04K 1/10* | (2006.01) |
| *H04L 27/28* | (2006.01) |
| *H04L 1/06* | (2006.01) |
| *H04L 1/00* | (2006.01) |
| *H04L 29/06* | (2006.01) |

(52) U.S. Cl.
CPC ............ *H04L 1/0625* (2013.01); *H04L 1/0017* (2013.01); *H04L 1/06* (2013.01); *H04L 65/60* (2013.01)

(58) Field of Classification Search
USPC ........................................................ 375/260
See application file for complete search history.

(56) References Cited

U.S. PATENT DOCUMENTS

2012/0069927 A1* 3/2012 Oyman et al. ................. 375/285

FOREIGN PATENT DOCUMENTS

| | | |
|---|---|---|
| CN | 1753493 A | 3/2006 |
| CN | 101305525 A | 11/2008 |
| CN | 102195759 A | 9/2011 |
| WO | 2011019962 A2 | 2/2011 |

OTHER PUBLICATIONS

International Search Report dated Apr. 4, 2013, cited in PCT application No. PCT/CN2012/087907 (4 pages).

* cited by examiner

*Primary Examiner* — Erin File
(74) *Attorney, Agent, or Firm* — Workman Nydegger

(57) ABSTRACT

Disclosed is a method for transmitting a video, which is used for increasing video transmission and receiving quality. The method comprises: generating multiple layers of video streams; in accordance with an obtained first distortion value, obtaining a corresponding first antennae/video matching matrix; separately dispatching each layer of video streams to respective antennae in accordance with the first antennae/video matching matrix; and transmitting same in accordance with the dispatched video streams. Also disclosed are a device for achieving the method, and a method and device for receiving a video.

13 Claims, 2 Drawing Sheets

METHOD AND DEVICE FOR TRANSMITTING AND RECEIVING VIDEO

CROSS REFERENCE TO RELATED APPLICATIONS

This application is a US National Stage of International Application No. PCT/CN2012/087907, filed on 28 Dec. 2012, designating the United States and claiming priority to China Patent application No. 201110452500.5, filed with the China Patent Office on Dec. 29, 2011, entitled "Methods and Devices for Video Transmission and Reception", both of which are incorporated herein by reference in their entirety.

FIELD OF THE INVENTION

The present invention relates to the field of communications and video coding, and particularly, relates to methods and devices for video transmission and reception.

BACKGROUND OF THE INVENTION

With the development of new generation scalable video compression standard and continuous improvement of the calculation capability and the storage capability of wireless equipment, applications based on wireless network video transmission are increasing. However, characteristics of a wireless channel, such as a time-variant characteristic, a high bit error rate, a low bandwidth and the like, seriously restrict and affect the quality of video received by a receiving end. As a multi-input-multi-output (MIMO) technology is put forward, the difficult problem is alleviated to a great extent.

Video stream with a multilayer structure generated by using a scalable video coding (SVC) technology is very suitable to be transmitted on an MIMO system. Different layers of the video stream are scheduled to different sub-channels and transmitted simultaneously, so as to support a high video bit rate. However, the time-variant characteristic of the wireless channel determines that at different moments, the quality of each sub-channel is not completely same and further has the time-variant characteristic. Moreover, the importance of each layer of data in an SVC video stream is not completely same either, for example, data of a base layer are most important; data of a first enhancement layer come second, and so on.

In the process of implementing technical solutions of embodiments of this application, inventors of this application at least discover that the prior art has the following technical problems:

if each video layer is equally treated indiscriminately according to the above-mentioned method, when the data of the base layer are scheduled to a sub-channel with poor quality condition, the quality of video received by the receiving end can be seriously affected.

Moreover, in an MIMO broadcast channel, each transmitting antenna probably corresponds to multiple sub-channels. Accordingly, the signal to noise ratio or packet loss rate of each antenna is actually determined by a vector, rather than a traditional single scalar. The vector can not be compared in size or sequence, so that the quality of the antenna can not be measured, and finally, an optimal video-antenna matching relation is difficult to be sought. Therefore, a video-antenna matching relation is generally randomly selected in the prior art, but the transmission quality can not be ensured in this case.

SUMMARY OF THE INVENTION

In embodiments of the present invention, methods and devices for video transmission and reception are provided for improving the video transmitting and receiving quality.

A method for video transmission includes the following steps:

generating multiple layers of video stream;

according to an acquired first distortion value, acquiring a first antenna-video matching matrix corresponding to the first distortion value;

scheduling each layer of the video stream to a corresponding antenna respectively according to the first antenna-video matching matrix; and performing video transmission according to scheduled video stream.

A method for video reception, includes the following steps:

acquiring different layers of video stream transmitted through the method for video transmission from all antennae respectively; and decoding received video stream to acquire video signals.

A device for video transmission, includes:

a generating module, configured to generate multiple layers of video stream;

an acquiring module, configured to, according to an acquired first distortion value, acquire a first antenna-video matching matrix corresponding to the first distortion value;

a scheduling module, configured to schedule each layer of the video stream to a corresponding antenna respectively according to the first antenna-video matching matrix; and a first transceiving module, configured to transmit the video according to scheduled video stream.

A device for video reception, includes:

a second transceiving module, configured to acquire different layers of video stream transmitted through the device for video transmission from all antennae respectively; and a decoding module, configured to decode the received video stream to acquire video signals.

The method for video transmission in the embodiment of the present invention includes: generating the multiple layers of video stream; according to the acquired first distortion value, acquiring the first antenna-video matching matrix corresponding to the first distortion value; scheduling each layer of the video stream to the corresponding antenna respectively according to the first antenna-video matching matrix; and peforming video transmission according to the scheduled video stream. The video stream is scheduled according to the acquired first antenna-video matching matrix, so that the antennae with high channel quality transmit video layers of high importance, thus ensuring that the receiving ends can receive video signals with high quality, and improving the video transmission quality.

DETAILED DESCRIPTION OF THE EMBODIMENTS

A method for video transmission in an embodiment of the present invention includes: generating multiple layers of video stream; according to an acquired first distortion value, acquiring a first antenna-video matching matrix corresponding to the first distortion value; scheduling each layer of the video stream to a corresponding antenna respectively according to the first antenna-video matching matrix; and performing video transmission according to the scheduled video stream. The video stream is scheduled according to the acquired first antenna-video matching matrix, so that the antennae with relatively high channel quality transmit video layers of high importance, thus ensuring that a receiving end can receive video signals with high quality, and improving the video transmission quality.

Figure 1:
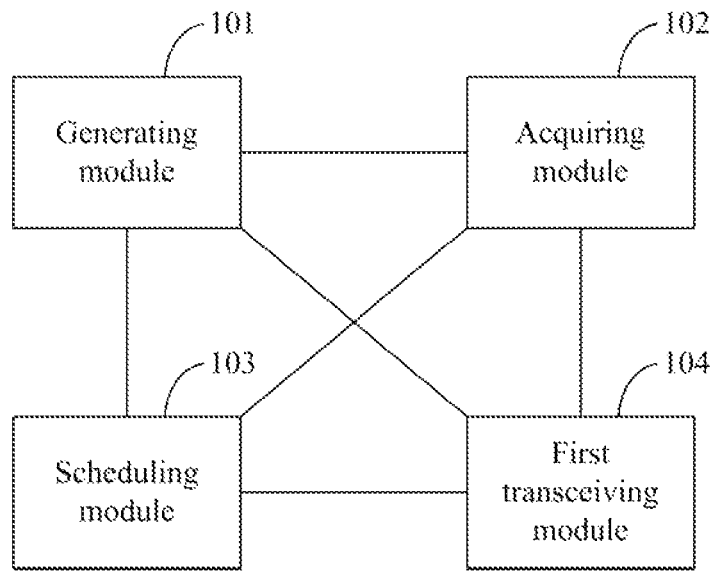
FIG. 1 is a main structural diagram of a device for video transmission in an embodiment of the present invention.

Referring to FIG. 1, a device for video transmission in an embodiment of the present invention includes a generating module 101, an acquiring module 102, a scheduling module 103 and a first transceiving module 104. The device may be located at a video transmitting end.

The generating module 101 is configured to generate multiple layers of video stream. The generating module 101 may generate the video stream with a multilayer structure by using a scalable video coding technology. In this case, the video stream generated by the generating module 101 may include a base layer and a plurality of enhancement layers, and the importance of each layer of data is different. For example, data of the base layer are most important, data of the first enhancement layer come second, and so on.

The acquiring module 102 is configured to, according to an acquired first distortion value, acquire a first antenna-video matching matrix corresponding to the first distortion value. The first distortion value is an expected distortion value. Preferably, the first distortion value may indicate the minimum average video distortion among average video distortions of video received by all receiving ends in each antenna-video matching matrix.

The solution of the embodiment of the present invention is described below, taking a low-complexity algorithm based on a simulated annealing algorithm as an example. It should be noted that this embodiment is only used for illustrating rather than limiting the present invention, and any other algorithms capable of solving the technical problems of the present invention and achieving the same technical effect as that in the present invention are also within the protection scope of the present invention. In this algorithm, some assumed conditions and concepts are involved and defined as follows:

assumed conditions: the number of video layers is assumed to be equal to the number of antennae in the embodiment of the present invention, and the value is expressed as L.

Involved related concepts are as follows:

temperature parameter: defined as $$T = e^{-\frac{i}{M}} - e^{-1} \quad (1)$$

wherein M is the maximum number of iterations of this algorithm, and i is the current number of iterations.

State: indicating any feasible antenna-video matching matrix, which can be expressed as matrix A in the embodiment of the present invention, wherein the form of A may be:

$$A = \begin{bmatrix} a_{11} & \cdots & \cdots & a_{1L} \\ \vdots & \cdots & \cdots & \vdots \\ \vdots & \cdots & \cdots & \vdots \\ a_{L1} & \cdots & \cdots & a_{LL} \end{bmatrix} \quad (2)$$

at the same time, it needs to satisfy:

$$\sum_{i=1}^{L} a_{il} = 1 \quad 1 \le i \le L \quad (3)$$

$$\sum_{l=1}^{L} a_{li} = 1 \quad 1 \le i \le L \quad (4)$$

namely, any antenna can only transmit a layer of video stream, and any layer of video stream can be transmitted on only one antenna.

Neighbor radius: defined as:

$$r = \max\left\{2, \frac{L^2 T}{1 - e^{-1}}\right\} \quad (5)$$

The neighbor radius changes with the temperature parameter, and determines the size of a neighbor range in a certain state.

Neighbor: if state $A_1$ and state $A_2$ satisfy $\|A_1 - A_2\|_F \le r$, namely the F norm of the difference between the state $A_1$ and the state $A_2$ is not larger than a first radius value, the state $A_1$ and the state $A_2$ may be defined as mutual neighbors. In this case, r may be named as the first radius value.

Transition probability: namely a probability of skipping from one state $A_c$ to another state $A_t$, and it can be calculated as follows:

$$q(A_c, A_t) = \begin{cases} 1, & D(P_t) \le D(P_c) \\ e^{\frac{D(P_t) - D(P_c)}{T}}, & \text{other conditions} \end{cases} \quad (6)$$

wherein $D(P_t)$ and $D(P_c)$ represent average video distortions in the state $A_c$ and the state $A_t$ respectively. The average video distortion means summating and averaging the distortion quantities of video received by all the receiving ends. In this case, after a certain state is determined, the distortion quantities of the video received by all the receiving ends in the state are known, and the distortion quantities are summated and averaged to obtain the average video distortion in the state.

The process of acquiring the antenna-video matching matrix is as follows:

1. firstly, initializing a temperature parameter T and an initial state $A_0$, calculating a second average video distortion $D_0$ corresponding to the state $A_0$, and at the same time, setting a minimum video distortion $D_{min} = D_0$ and a state $A_{min} = A_0$ corresponding thereto, wherein the initial state $A_0$ may be any randomly selected state, and the initial state $A_0$ may also be named as a second antenna-video matching matrix.

2. updating the temperature parameter according to formula (1).
3. in a neighbor range of $A_0$, randomly selecting a state $A_t$ as a target state, wherein $A_t$ may also be named as a third antenna-video matching matrix; and calculating the distortion $D_t$ of the state $A_t$, wherein $D_t$ may also be named as a third average video distortion. If $D_{min} > D_t$, let $D_{min} = D_t$ and $A_{min} = A_t$.
4. if already let $A_{min} = A_t$, performing state transition. At this moment, the transition probability may be 1.
5. if $D_{min}$ is not larger than $D_t$, not performing operation, or setting $A_t$ as the current antenna-video matching matrix with a first transition probability. The first transition probability may be calculated according to formula (6). If $D_{min}$ is not smaller than $D_t$, the following processing mode may be adopted in the embodiment of the present invention: generating a second transition probability by using a random function, comparing the second transition probability with the first transition probability generated through calculation by using formula (6), and determining to perform state transition according to the first transition probability if the second transition probability is smaller than the first transition probability. At this moment, the minimum distortion does not need to be reset, namely the minimum video distortion $D_{min}$ is still equal to the second average video distortion $D_0$. If the second transition probability is not smaller than the first transition probability, state transition may not be performed.
6. repeatedly executing the steps 3 to 4, wherein the times may be expressed as M.
7. when the current state is $A_{min}$, repeatedly executing the steps 2 to 5, wherein the times may be expressed as N.
8. acquiring final $D_{min}$ and $A_{min}$.

Specifically, the process of acquiring the antenna-video matching matrix may be as follows:
1. firstly, initializing the temperature parameter T and the initial state $A_0$, calculating the corresponding second average video distortion $D_0$ corresponding to the state $A_0$, and at the same time, setting the minimum video distortion $D_{min} = D_0$ and the state $A_{min} = A_0$ corresponding thereto, wherein the initial state $A_0$ may be any randomly selected state, and the initial state $A_0$ may also be named as a second antenna-video matching matrix.
2. updating the temperature parameter according to formula (1).
3. within the neighbor range of $A_0$, randomly selecting a state $A_t$ as a target state, wherein $A_t$ may also be named as a third antenna-video matching matrix; and calculating the distortion $D_t$ of the state $A_t$, wherein $D_t$ may also be named as a third average video distortion. If $D_{min} > Dt$, then let $D_{min} = D_t$ and $A_{min} = A_t$, and continue to execute the step 4. If $D_{min}$ is not larger than $D_t$, operation may not be performed, and the step 5 is executed; or $A_t$ can be set as the current antenna-video matching matrix (a second antenna-video matching matrix) with a first transition probability, and the step 5 is executed. The first transition probability may be calculated according to formula (6). If $D_{min}$ is not larger than $D_t$, the following processing mode may also be adopted in the embodiment of the present invention: generating a second transition probability by using a random function, comparing the second transition probability with the first transition probability generated through calculation by using formula (6), and determining to perform state transition according to the first transition probability if the second transition probability is smaller than the first transition probability. At this moment, the minimum distortion does not need to be reset, namely the minimum video distortion $D_{min}$ is still equal to the second average video distortion $D_0$, and the step 5 is executed. If the second transition probability is not smaller than the first transition probability, state transition may not be performed, and the step 5 is executed.
4. if already let $A_{min} = A_t$, performing state transition. At this moment, the transition probability may be 1.
5. repeatedly executing the steps 3 to 4, wherein the times may be expressed as M.
6. when the current state is $A_{min}$, repeatedly executing the steps 2 to 5, wherein the times may be expressed as N.
7. acquiring the final $D_{min}$ and $A_{min}$.

In this case, the state $A_{min}$ represents the final video-antenna matching mode, which may be named as the first antenna-video matching matrix in the embodiment of the present invention; and $D_{min}$ is the average video distortion in this mode. In this case, the $D_{min}$ in the embodiment of the present invention may be named as the first distortion value, namely the minimum average video distortion among average video distortions of video received by all the receiving ends in each antenna-video matching matrix.

The steps are repeatedly executed, for extending the selection range to all states as much as possible, thus selecting the best state from all the states and achieving the best video transmission effect as much as possible.

The acquiring module 102 is also configured to acquire a signal to noise ratio (SNR) of each sub-channel of each antenna according to channel quality state information sent back from each video receiving end to form a channel state matrix, and acquire the distortion quantity of video received by each video receiving end in the current state according to the channel state matrix and the current state, thus acquiring the average video distortion received by each video receiving end in the current state.

The scheduling module 103 is configured to schedule each layer of the video stream to a corresponding antenna respectively according to the first antenna-video matching matrix.

The first transceiving module 104 is configured to transmit the video according to the scheduled video stream. The first transceiving module 104 transmits different layers of video stream on all antennae respectively.

Figure 2:
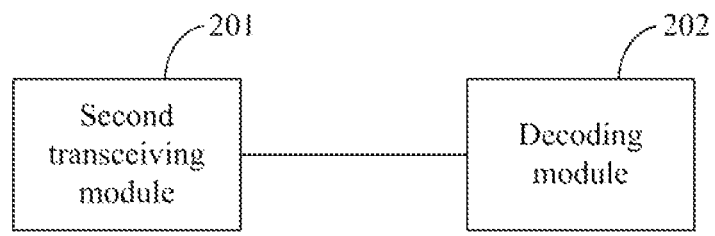
FIG. 2 is a main structural diagram of a device for video reception in an embodiment of the present invention.

Referring to FIG. 2. a device for video reception in an embodiment of the present invention includes a second transceiving module 201 and a decoding module 202. The device for video reception may be located at a video receiving end.

The second transceiving module 201 is configured to acquire different layers of video stream from all antennae respectively. The second transceiving module 201 acquires the video stream transmitted by the device for video transmission from all the antennae respectively. The second transceiving module 201 is also configured to feed channel quality state information back to the device for video transmission. Suppose L antennae and L video receiving ends are present in the embodiment of the present invention, each antenna has L sub-channels, each video receiving end corresponds to a sub-channel of each antenna, then each video receiving end feeds the channel quality state information of a different sub-channel of a different antenna back to the device for video transmission, so that after the device for video transmission receives the channel quality state information, the device for video transmission acquires a channel state matrix according to the channel quality state information.

The decoding module 202 is configured to decode the received video stream to acquire video signals. After the second transceiving module 201 receives the video stream, the decoding module 202 performs channel decoding on the video stream to obtain decoded video stream, and the video stream subjected to channel decoding is decoded by using an SVC decoder and combined to obtain decoded video signals.

The methods for transmitting and receiving the video in embodiments of the present invention are introduced below through particular embodiments.

Figure 3:
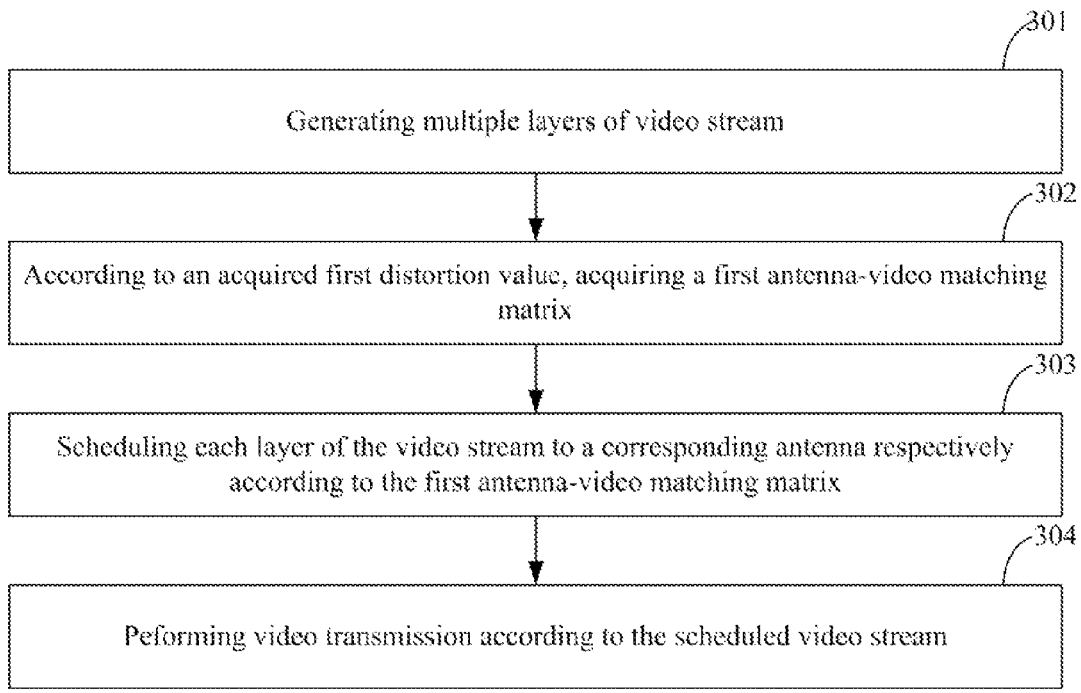
FIG. 3 is a main flow diagram of a method for video transmission in an embodiment of the present invention.

Referring to FIG. 3, the main flow of a method for video transmission in an embodiment of the present invention includes:

step 301: generating multiple layers of video stream;
step 302: according to an acquired first distortion value, acquiring a first antenna-video matching matrix;
step 303: scheduling each layer of the video stream to a corresponding antenna respectively according to the first antenna-video matching matrix; and
step 304: performing video transmission according to the scheduled video stream.

Figure 4:
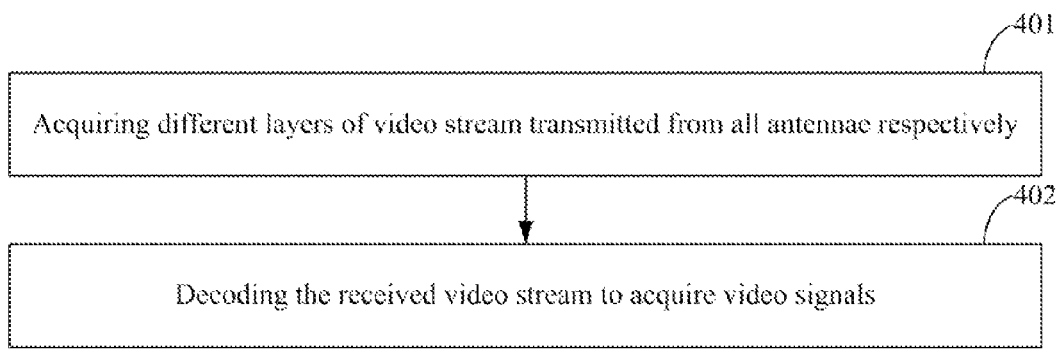
FIG. 4 is a main flow diagram of a method for video reception in an embodiment of the present invention.

Please see FIG. 4. A method for video reception in the embodiment of the present invention has the following main flow:

step 401: acquiring different layers of video stream from all antennae respectively; and
step 402: decoding the received video stream to acquire video signals.

The method for video transmission in the embodiments of the present invention includes: generating the multiple layers of video stream; according to the acquired first distortion value, acquiring the first antenna-video matching matrix; scheduling each layer of the video stream to the corresponding antenna respectively according to the first antenna-video matching matrix; and peforming video transmission according to the scheduled video stream. In the embodiment of the present invention, the video stream is scheduled according to the acquired first antenna-video matching matrix, so that the antennae with high channel quality transmit video layers of high importance, thus ensuring that the video receiving ends can receive video signals with high quality, and improving the video transmission quality. At a video transmission end, namely a video sending end, asymmetrical protection is realized by mapping the different layers of video stream to the different antennae respectively. In addition, the selection range is extended to all states as much as possible through multiple iterations, and the optimal state is selected from all the states, namely the optimal antenna-video matching matrix is selected, so that the average distortions of video received by all users reach the minimum, and the quality of video received by the users is improved. Moreover, the present invention is easy to implement and easy to operate.

It should be appreciated by those skilled in the art that the embodiments of the present invention may be provided as methods, systems or computer program products. Therefore, the present invention may adopt the form of complete hardware embodiments, complete software embodiments or embodiments of software and hardware in combination. Moreover, the present invention may adopt the form of computer program products implemented on one or more computer-useable storage media (including but not limited to a magnetic disk memory, an optimal memory and the like) including computer-usable program codes.

The present invention is described with reference to flow diagrams and/or block diagrams of the method, equipment (system) and computer program products according to the embodiments of the present invention. It should be understood that each flow and/or block in the flow diagrams and/or block diagrams and combination of flows and/or blocks in the flow diagrams and/or block diagrams may be implemented by computer program instructions. These computer program instructions may be supplied to a general computer, a dedicated computer, an embedded processor or a processor of other programmable data processing equipment to produce a machine, so that a device for achieving functions designated in one or more flows of the flow diagrams and/or one or more blocks of the block diagrams is produced through the instructions executed by the computer or the processor of other programmable data processing equipment.

These computer program instructions may also be stored in a computer-readable memory capable of guiding the computer or other programmable data processing equipment to work in a specific mode, so as to generate a manufactured product including an instruction device through the instructions stored in the computer-readable memory, and the instruction device implements the functions designated in one or more flows of the flow diagrams and/or one or more blocks of the block diagrams.

These computer program instructions may also be loaded to the computer or other programmable data processing equipment, so that a series of operation steps are executed in the computer or other programmable data processing equipment to produce processing implemented by the computer, and the instructions executed in the computer or other programmable data processing equipment provide steps of implementing the functions designated in one or more flows of the flow diagrams and/or one or more blocks of the block diagrams.

Obviously, various modifications and variations could be made to this application by those skilled in the art without departing from the spirit and scope of the present invention. Thus, provided that these modifications and variations made to this application are within the scope of the claims of this application and equivalent technologies thereof, this application is intended to cover these modifications and variations.

The invention claimed is:

1. A method for video transmission, comprising:
generating multiple layers of video stream;
according to an acquired first distortion value, acquiring a first antenna-video matching matrix corresponding to the first distortion value;
scheduling each layer of the video stream to a corresponding antenna respectively according to the first antenna-video matching matrix; and
performing video transmission according to scheduled video stream;
wherein the acquiring the first antenna-video matching matrix corresponding to the first distortion value according to the acquired first distortion value comprises:
(1)—randomly acquiring an antenna-video matching matrix as a second antenna-video matching matrix, acquiring a second average video distortion corresponding to the second antenna-video matching matrix, and setting the second average video distortion as a minimum video distortion;
(2)—updating a temperature parameter;
(3)—randomly selecting an antenna-video matching matrix as a third antenna-video matching matrix, and acquiring a third average video distortion corresponding to the third antenna-video matching matrix;
(4)—judging whether the third average video distortion is smaller than the second average video distortion or not;
(5)—setting the third average video distortion as a minimum video distortion when a result of the judging is positive;
(6)—setting the third antenna-video matching matrix as a current antenna-video matching matrix;

(7)—repeatedly executing (3) to (6) for M times;
(8)—repeatedly executing (2) to (7) for N times; and
(9)—determining the minimum video distortion obtained after (8) as the first distortion value, and acquiring the first antenna-video matching matrix corresponding to the first distortion value according to the determined first distortion value.

2. The method according to claim 1, wherein the first distortion value indicates the minimum average video distortion among average video distortions of video received by all receiving ends in each antenna-video matching matrix.

3. The method according to claim 1, further comprising, after (4): when the result of the judging is negative, setting the third antenna-video matching matrix as the current antenna-video matching matrix with a first transition probability.

4. The method according to claim 1, wherein the temperature parameter is a parameter acquired according to a maximum number of iterations and a current number of iterations.

5. The method according to claim 1, wherein the randomly selecting the antenna-video matching matrix as the third antenna-video matching matrix comprises: randomly selecting an antenna-video matching matrix as the third antenna-video matching matrix within a neighbor range of the second antenna-video matching matrix.

6. The method according to claim 5, wherein when an F norm of a difference between the second antenna-video matching matrix and the third antenna-video matching matrix is not larger than a first radius value, it is determined that the third antenna-video matching matrix is within the neighbor range of the second antenna-video matching matrix.

7. A method for video reception, comprising:
acquiring different layers of video stream transmitted, by the method for video transmission according to claim 1, from all antennae respectively; and
decoding received video stream to acquire video signals.

8. A device for video transmission, comprising:
a generating module, configured to generate multiple layers of video stream;
an acquiring module, configured to, according to an acquired first distortion value, acquire a first antenna-video matching matrix corresponding to the first distortion value;
a scheduling module, configured to schedule each layer of the video stream to a corresponding antenna respectively according to the first antenna-video matching matrix; and
a first transceiving module, configured to perform video transmission according to scheduled video stream;
wherein the acquiring module is further configured to:
randomly acquire an antenna-video matching matrix as a second antenna-video matching matrix, acquire a second average video distortion corresponding to the second antenna-video matching matrix, and set the second average video distortion as a minimum video distortion;
update a temperature parameter;
randomly select an antenna-video matching matrix as a third antenna-video matching matrix, and acquire a third average video distortion corresponding to the third antenna-video matching matrix;
judge whether the third average video distortion is smaller than the second average video distortion or not;
set the third average video distortion as the minimum video distortion when a result of the judging is positive;
set the third antenna-video matching matrix as a current antenna-video matching matrix;
determine the finally obtained minimum video distortion as the first distortion value, and acquire the first antenna-video matching matrix corresponding to the first distortion value according to the determined first distortion value.

9. The device according to claim 8, wherein the first distortion value indicates a minimum average video distortion among average video distortions of video received by all receiving ends in each antenna-video matching matrix.

10. The device according to claim 8, wherein the acquiring module is further configured to set the third antenna-video matching matrix as the current antenna-video matching matrix with a first transition probability when the result of the judging is negative.

11. The device according to claim 8, wherein the temperature parameter is a parameter acquired according to a maximum number of iterations and a current number of iterations.

12. The device according to claim 8, wherein the acquiring module is further configured to randomly select an antenna-video matching matrix as the third antenna-video matching matrix in a neighbor range of the second antenna-video matching matrix.

13. The device according to claim 12, wherein the acquiring module is further configured to determine that the third antenna-video matching matrix is within the neighbor range of the second antenna-video matching matrix when F norm of a difference between the second antenna-video matching matrix and the third antenna-video matching matrix is not larger than a first radius value.

* * * * *